United States Patent Office 3,428,961
Patented Feb. 25, 1969

3,428,961
UNIVERSAL JOINT WITH GUIDED RESTRAINT SYSTEM FOR PRESSURIZED ASSEMBLIES
Otto Schueller, Dayton, Ohio, assignor to the United States of America as represented by the Secretary of the Air Force
Filed Nov. 5, 1965, Ser. No. 506,918
U.S. Cl. 2—2.1          3 Claims
Int. Cl. B63c 11/06

ABSTRACT OF THE DISCLOSURE

A pressure suit made of flexible impervious material which has bendable arm, leg and body enclosure portions that are extensible longitudinally and nonextensible transverse to the arm, leg and body portions. The suit includes annular flexible anchor means or bands which are secured within the suit around the arm, leg and body portions in spaced relation to each other at the opposite ends of each of the bendable portions in each of the arm, leg and body portions. An equal number of cable pulleys are rotatably secured in equal circumferentially spaced relation around the inside surface of each pair of the spaced anchor bands. The locations of the pulleys at one end of each of the bendable portions are staggered with respect to the locations of the pulleys on the spaced band at the other end of that bendable portion of the suit. An endless or continuous, flexible, nonextensible, cable extends across each of the bendable portions of the suit, back and forth between the pulleys which are located around the bands at the opposite ends of each of the bendable portions in somewhat zigzag fashion, and is self adjustable within the suit to prevent extension of the spacing between the pulley supporting bands and the enclosing extensible suit material therebetween while permitting the free and easy bending thereof by the occupant who is wearing the suit when the internal pressure within the suit exceeds the external pressure outside of the suit.

The invention described herein may be used by or for the United States Government for governmental purposes without payment to me of any royalty thereon.

This invention relates to pressurized garments, such as aviators' full pressure suits, space suits, divers' suits, and flexible bendable manipulators in space cabins, in outer space, etc., in which the garments or manipulators are inflated and pressurized internally to a relatively greater internal pressure than the exterior pressure, having for an object means to greatly improve the bending mobility of such pressurized garments or manipulators to overcome the stiffness and resistance to bending thereof in any direction when inflated, and also effect an elimination of the energy normally required in pressure suits, garments, and manipulators to maintain the bent portions aforesaid in substantially any bent or adjusted position, and comprises novel improvements over my prior patent application, Ser. No. 300,383, filed Aug. 6, 1963, for Flexible Structure for Pressurized Garments, having for a further object the provision of an inflatable garment which is extensible longitudinally, relative to the wearer's body portions, such as his legs, arms, and trunk, but is nonextensible or expandable circumferentially around the wearer's body portions, such as his arms, legs and trunk portion and includes endless, nonstretchable cable means extending in self-adjusting substantially inwardly spaced longitudinal directions back and forth between the opposite ends of the interior of the trunk, leg, and body portions of the garment to permit substantially free articulation or bending movements thereof while resisting longitudinal extension thereof, particularly while the garment or manipulators are internally inflated or pressurized.

A further object of the invention is the provision of a self-adjusting and tension equalizing cable restraint system operable within a flexible inflatable full pressure suit having bendable portions, which takes up the elongation forces exerted by internal pressure within the suit without disturbing the circumferentially restrained suit material enclosing the joint portions of the wearer; thus eliminating stiffness and resistance to bending in the bendable portions of the suit.

A further object is the provision of a full pressure suit in which cable guide means are spaced internally of the suit along and around the inside of the joint portions in a double helical arrangement in somewhat zigzag fashion with antifriction cable guide means at the opposite ends of the joints, and endless substantially nonstretchable cable means slidable in said cable guide means and extending back and forth through said guide means from one end to the other end of the joint portions and simultaneously around the circumference thereof, whereby elongation of the outer curvature of the joint portions during bending is compensated by corresponding contraction of the inner curvature in whatever direction the joint is being bent and the average length and volume of the joint portions is kept practically constant, and compression work on the inflation fluid or gas within the suit is eliminated and the internal inflation pressure in the suit, particularly in the joints or bendable portions, retains the inner surface of the suit or garment in outwardly spaced relation to the cable means to avoid excessive rubbing, friction and wear between the cable means and the inner surface of the suit or garment material.

A further object is the provision of a pressure suit having bendable joint portions adapted to surround and extend beyond the opposite ends of the wearer's joints or bendable portions, composed of air impervious flexible material which is substantially nonextensible circumferentially around the joint portions but is extensible longitudinally relative to the joint portions and includes substantially antifraction cable guide means secured circumferentially around the interior of the opposite ends of the joint portions in substantially uniformly spaced relation to each other with endless, flexible, nonstretchable cable means extending back and forth alternatively around the interior of the joint portions through said cable guide means at the opposite ends of the joint portions to provide internal self-equalizing flexible nonstretchable connections between the opposite ends of the interior of the joint portions of the garment, to permit relatively free bending of the joint portions while resisting elongation thereof during internal inflation and pressurization of the interior of the garment.

A further object is the provision of an internal fluid pressurized high altitude space suit for spacecraft and outer space comprising a body portion having bendable arm and leg enclosure portions composed of impervious flexible material which is extensible longitudinally relative to the body, leg, and arm portions and nonextensible circumferentially around the joint portions, including endless nonextensible, flexible, self-adjusting cable means extending in substantially longitudinal directions within and around the arm, leg, and body portions in inwardly spaced relation out of frictional contact with the inner surface of the arm, leg, and body portions of the suit to resist extension of said portions during bending and torsional adjustments thereof, while said portions are inflated to pressurize the suit.

A further object is the provision of a full pressure suit of flexible air impervious material which is extensible longitudinally with respect to the trunk, leg, and arm portions of the suit and is substantially nonextensible circumferentially around said trunk, leg, and arm joint portions, and an endless flexible, nonstretchable self-adjusting cable system slidably connected within the suit between the opposite ends of the bendable joint portions and extending alternately back and forth around the suit between said ends to resist extension of said trunk, leg, and arm portions by internal inflation pressure when the suit is inflated, in which said cable system is disposed in inwardly spaced relation to the interior surface of the suit to prevent rubbing, friction and wear between the cable system and the suit when inflated, and leave the exterior of the suit free from any cable means or obstructions such as shown in my aforementioned patent application.

Other objects and advantages of the invention will become apparent from the following description and accompanying drawings in which like reference characters refer to like parts in the several figures.

Figure 1:
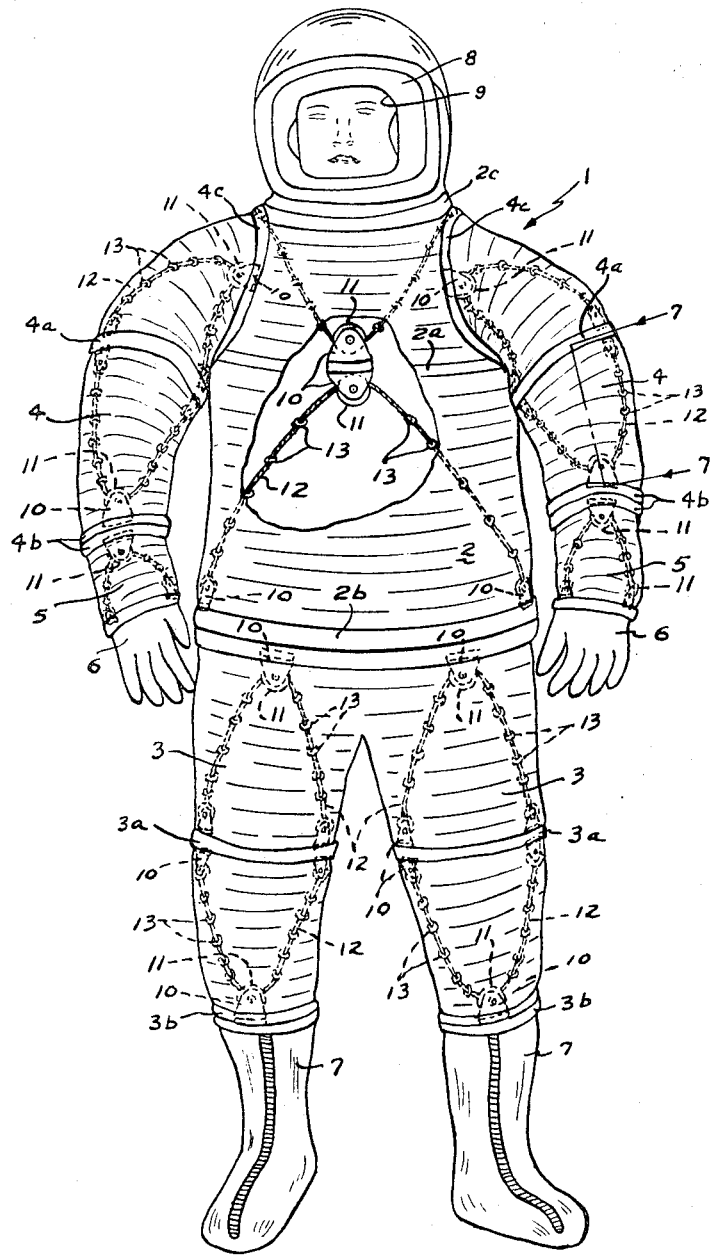
FIG. 1 is a somewhat schematic front elevation view of a full pressure suit incorporating one form of the invention, showing the self-adjustable cable restraining system in dotted lines because it is on the inside of the garment, parts broken away to show the cables.
Figure 2:
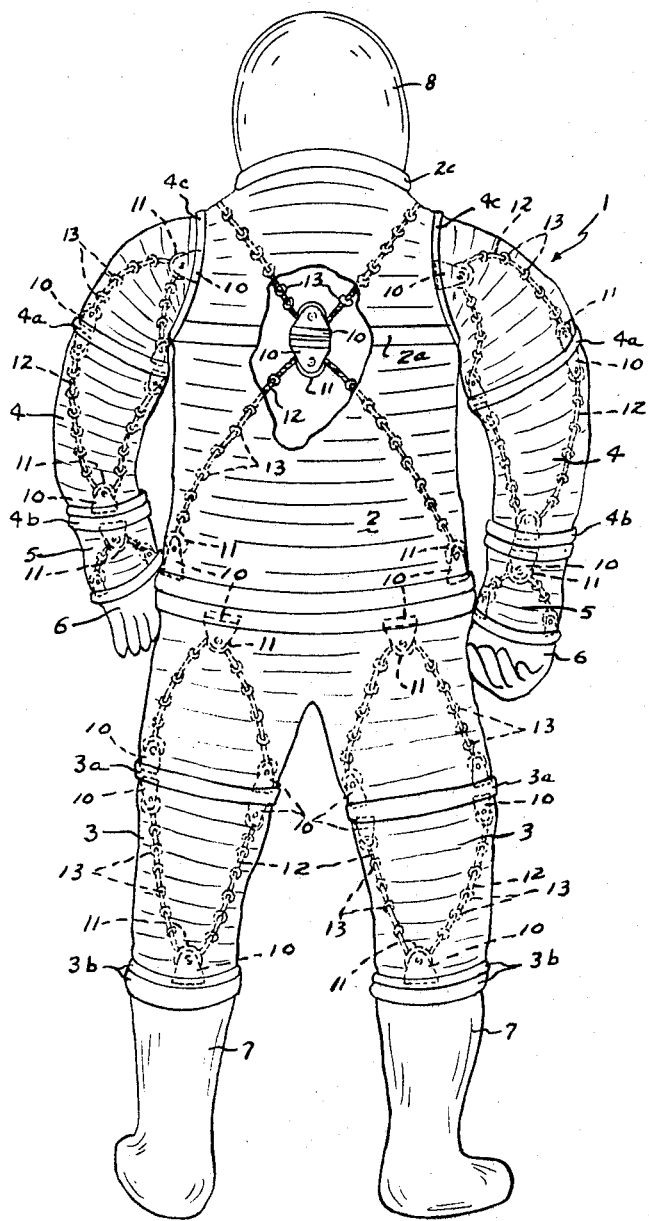
FIG. 2 is a rear view of the suit shown in FIG. 1, illustrated somewhat schematically.

Referring first to FIGURES 1 and 2 the reference numeral 1 denotes a pressure suit generally which is inflatable in the conventional manner by means not shown. The suit being of flexible air impervious material comprises a body or trunk portion 2, bendable leg enclosure portions 3 and arm enclosure ports 4.

The suit material is preferably extensible longitudinally to a predetermined extent, relative to the arm, leg, and trunk or body portions 4, 3, and 2 of the suit but substantially non-extensible circumferentially around said portions. Suitable anchor bands or reinforcing belts or hoops encircle the body 2, legs 3 and arm portions 4 between the bendable portions as indicated respectively at 2a, 2b, 2c, 3a, 3b, 4a, and 4b to form anchor means or bands for attaching the flexible, nonstretchable self-adjusting cable system, later to be described.

The band 2b may be of a two part (double band) construction with suitable sealing and securing connections therebetween to provide for separation, when desired, between the upper and lower sections of the suit.

Reinforcing anchor bands 4c may be built or formed in the suit between the arm enclosures 4 and the shoulder portions of the body section 2.

The bands 4b may also comprise two piece sealed antifriction swiveled parts of joints to permit torsional movement between the hand enclosure ends 5 and the sleeve portions of the arm enclosures 4. These may be also separable and connected together in sealed relation and carry the hand enclosures or gloves 6. Likewise the bands 3b may be of separable two-part sealed construction and carry the lower closure extensions or boot portions 7 of the suit.

A conventional full pressure suit helmet, indicated at 8, is removably sealed on the upper neck band 2c in any conventional manner, and provided with a transparent window or visor 9.

As mentioned above the suit material is extensible or stretchable in one direction only, namely longitudinally, relative to the wearer's body, arms and legs but is nonstretchable transversely or circumferentially around the wearer's body, arms and legs and is also made air impervious so that the suit may be inflated when desired, such as when exposed to low exterior pressures in high altitudes, in space capsules, and in outer space. In which event a suitable oxygen or oxygen mixture supply means of conventional type will be provided for supplying oxygen to the interior of the helmet 8 and the wearer in the usual manner (not shown) for full pressure suits.

The self-adjusting nonextensible cable means or system is shown in dotted lines in FIGS. 1 to 6, and forms an important part of the invention. Certain portions of the outer flexible noncircumferentially stretchable impervious suit material is broken away to show portions of the cables, pulleys, and guide means in full lines.

Located on the bands or rings, for instance 2a and 2b, 2a and 2c, 4c and 4a, 4b and 4a, 2b and 3a, 3a and 3b, etc. in circumferentially spaced relation to each other and inside of the suit are brackets 10, each having preferably an antifriction cable guide pulley 11 journalled therein, the brackets 10 and pulleys 11 are mounted on the inside circumference of the bands, and as seen in FIGS. 1, 2 and 7 and 8, the pulley units located at one end of the bendable portions are disposed intermediate the locations of the pulley elements at the other ends of the bendable portions of the suit.

Figure 8:
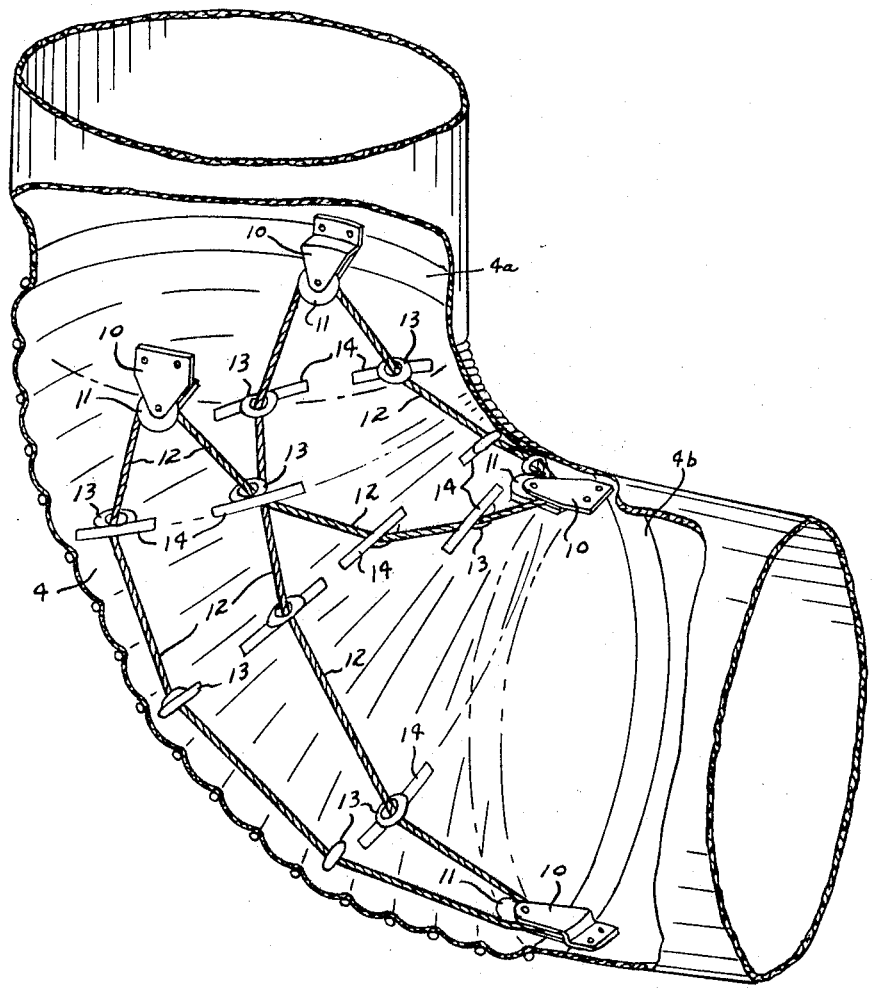
FIG. 8 is a sectional perspective view illustrating the joint portion shown in FIG. 7 in bent condition.

Endless nonstretchable flexible cable means 12 extend alternately around and through the pulley guide means 11 in zigzag fashion longitudinally back and forth around the inside of the point or bendable portions of the suit and prevent elongation of the surrounding longitudinally stretchable or extensible portions of the suit but are adjustable around the pulley means when the joint portions are bent (as seen in FIG. 8).

When the suit 1 is inflated the outward pressure on the interior of the suit material holds the inner surface of the suit in outwardly spaced relation to the tensioned cable means 12 to prevent frictional contact or rubbing between the cables and inner suit surface.

Suitable guide means, such as cable guide rings 13 may be secured to the interior of the bendable portions of the suit as shown in the drawings by any suitable means 14 with the cable means 12 slidably disposed in free sliding guided relation through these rings 13.

As seen in FIG. 8, schematically illustrating one of the bendable portions, when any of the bendable (joint or body surrounding) portions are bent the endless cable 12 is selfadjusting through the guide rings 13 and around the pulleys 11 to permit free bending while resisting elongation of the limb enclosure portions, and provides equal tension of the cable means 12 on the inside and outside curvature of the bend, thus balancing the internal inflation pressure which would normally cause resistance to bending, and when bent would require considerable expenditure of energy of the wearer to maintain the bent portions of the suit in bent position.

Some objections to the cable network on the exterior of a pressure suit, such as disclosed in my previously mentioned patent application, may be noted due to the cables tending to catch on obstructions, for instance in space aircraft cabins, also the sliding adjustments are likely to cause friction between the cables, also objectionable friction and rubbing on the exterior of the suit, requiring some additional energy to bend or move the bent joints. This interface friction is substantially reduced or eliminated by the arrangement disclosed herein. Another advantage obtained by this invention is that the arrangement of the sliding restraint system internally in the gas inflation atmosphere of the assembly in the interior of the pressure suit circumvents not only the problem of interface friction but also prevents "cold welding" between the parts by exposure to the vacuum of outer space, which is very important when the suit is worn where an occupant would be exposed to the extremes of outer space conditions.

Figure 3:
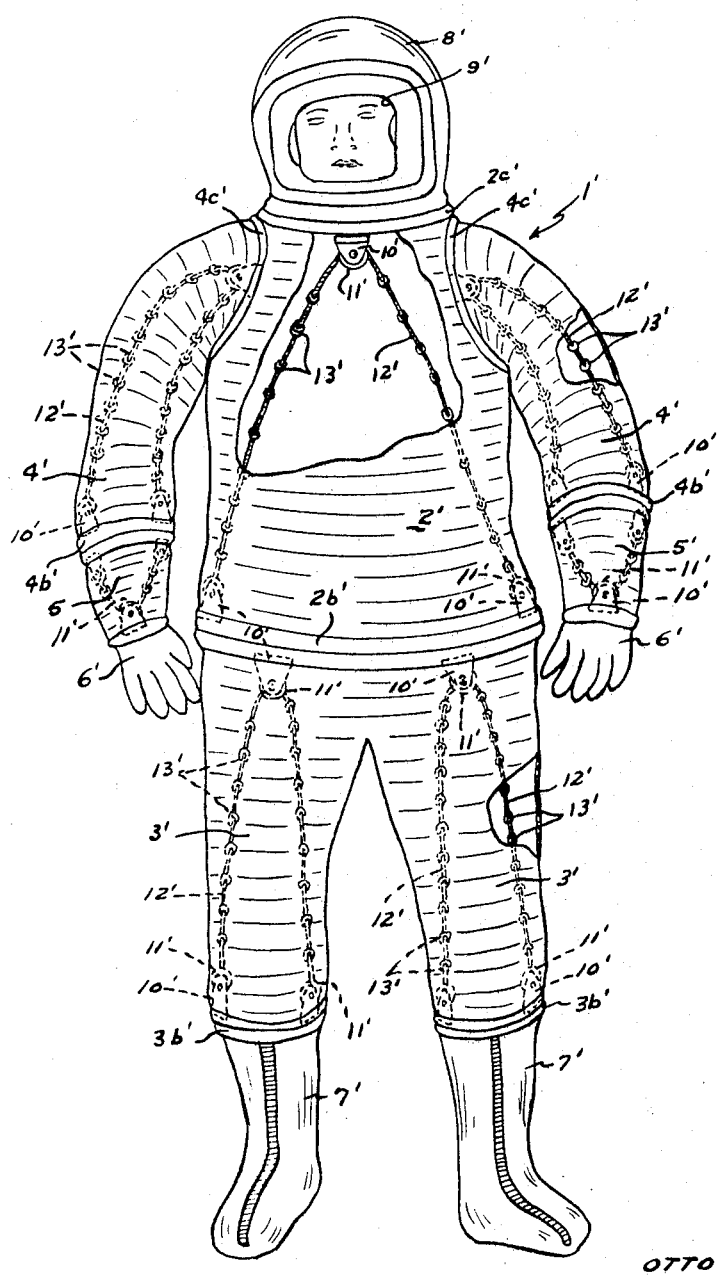
FIG. 3 is a somewhat schematic front view of a pressure suit, showing a slightly modified and somewhat simplified restraining cable system with the cable system inside of the suit shown in dotted lines.
Figure 4:
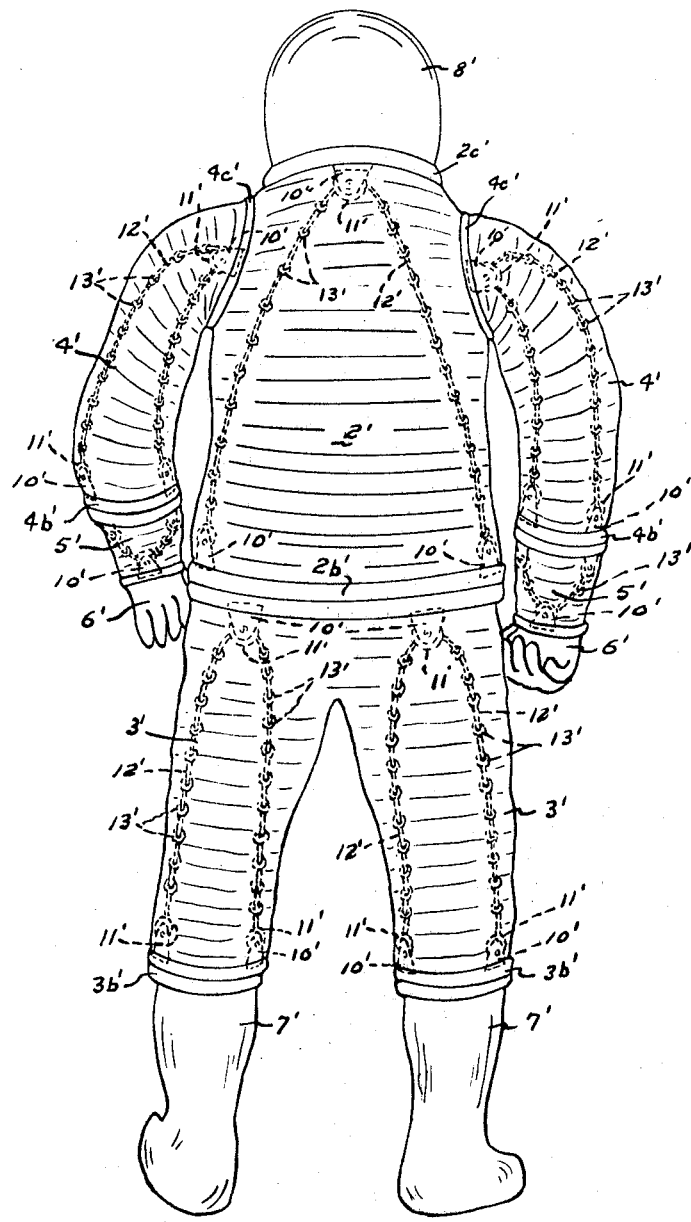
FIG. 4 is a rear view of the suit shown in FIG. 3.

FIGURES 3 and 4 are constructed similar in principle to the construction shown in FIG. 1 and the same reference characters are therefore used therein but primed, the main difference being that the inner tension cables 12' are longer, for instance extending between pulleys 11' which are journalled in brackets 10' that are alternately fixed at substantially the opposite extremities of the trunk 2', arms 4' and leg portions 3' (above the boot portions 7'). The cables 12' extend helically up and down in zigzag fashion around the aforesaid portions to permit free bending adjustments while preventing longitudinal extensions of the suit material when the suit is inflated, under exterior low or zero pressure conditions.

Suitable cable guide rings 13' for the cables 12' are secured to the inner surface of the garment to retain the cables 12' in place while permitting free sliding thereof through the rings 13' at all times. The "anchor" bands or rings for securing the pulley brackets are indicated at 2c', 2b', 3c', 4c' and 4b', similar to the anchor bands shown in FIGS. 1 and 2.

Referring to FIGS. 5, 6, 9 and 10, the arrangement is also quite similar to the other forms of the invention except that the cable system extends longitudinally between the ends of the joints of the wearer and transversely or circumferentially around the ends, as shown in the drawings. This provides additional torsional freedom between the limbs and body. Since the suit, otherwise, would be substantially the same as in the former described disclosures the reference numerals relating to the full pressure suit shown therein will be the same as in the preceding figures, except that they are double primed (″).

The suit 1″ comprises the body or trunk portion 2″, leg and arm portions 3″ and 4″ and the cable pulley supporting rings or bands 4c″, 4b″, 2b″, and 3b″ with the glove portions 5″–6″ swiveled, and the boot portions 7″, which are sealed and preferably separable.

In this form the endless nonstretchable cable members 12″ extend back and forth in spaced substantially parallel relation through the guide rings 13″ which are secured to the inside of the suit material, and then around the spaced pulleys 11″ which are secured on the "anchor" bands at the opposite ends of the sections 2″, 3″ and 4″ of the suit in spaced circumferential directions.

Figure 5:
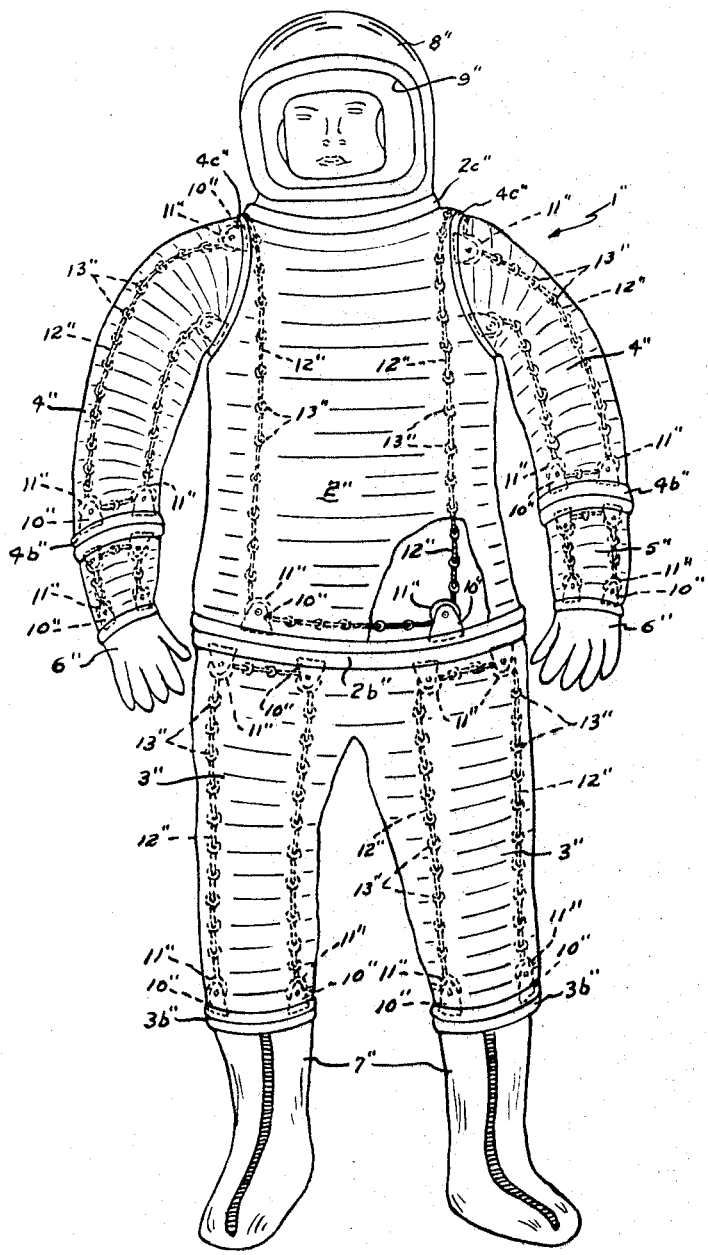
FIG. 5 is a front view of a suit showing a further modification with the internal cable system shown in dotted lines in which the cables between the ends of the bendable sections extend substantially parallel and longitudinally.
Figure 6:
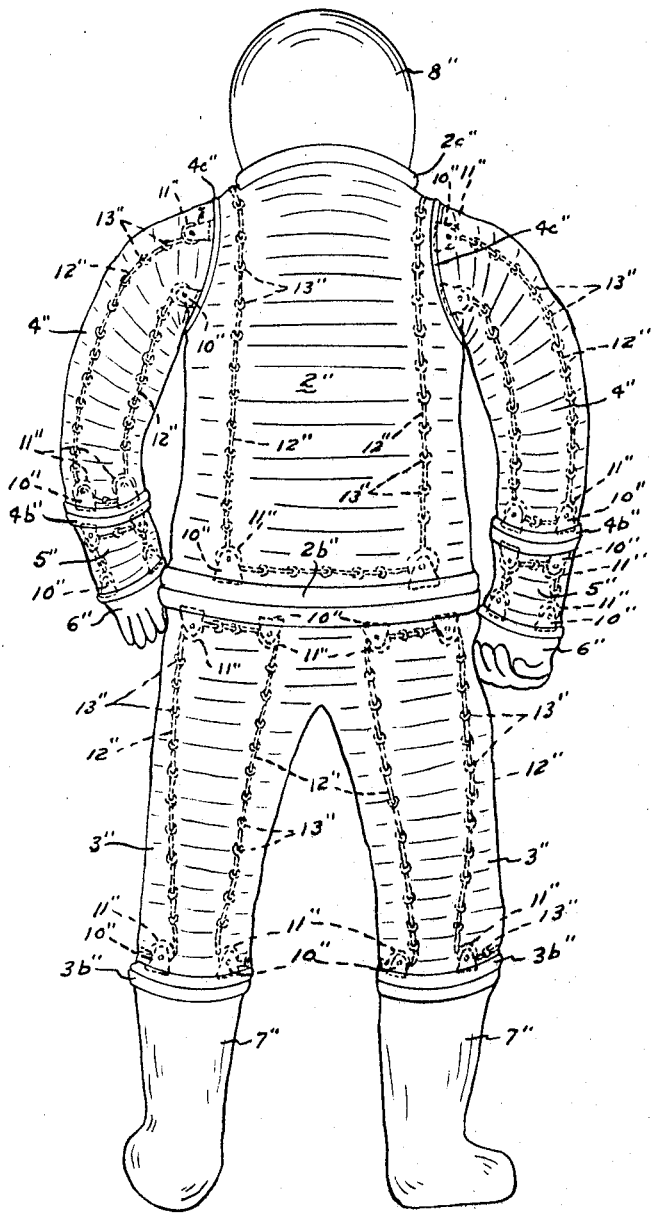
FIG. 6 is a rear view of the suit shown in FIG. 5.
Figure 7:
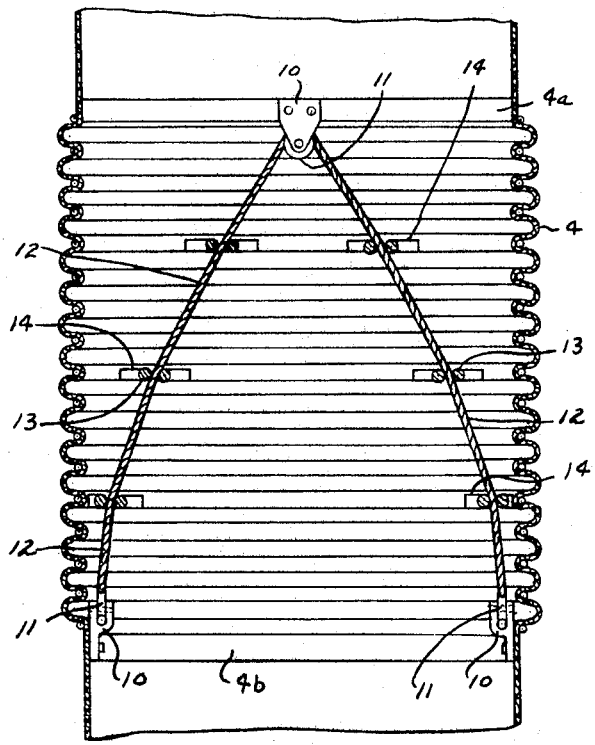
FIG. 7 is a somewhat schematic fragmentary longitudinal sectional view through one of the bendable joint portions of a pressure suit or manipulator incorporating the invention, for instance taken about on line 7—7 of FIG. 1 or 2, looking in direction of the arrows.

In other words the cables 12″, referring to FIGS. 5 and 6, extend longitudinally up through one row of the guide rings 13″, then around the upper pulleys, then circumferentially adjacent the upper band, then around the next pulley 11″ and longitudinally down through the next row of rings 13″ and around the next pulleys 11″, then circumferentially around the body or limb portions adjacent the other or lower supporting or anchor band and then up through the next row of rings 13″, etc.

As shown in FIGS. 5, 6, 9 and 10, each of the endless cable means is formed with four longitudinally disposed reaches, and two alternately disposed spaced circumferentially extending reaches at each end, one endless cable system for each of the bendable portions of the suit.

Figure 9:
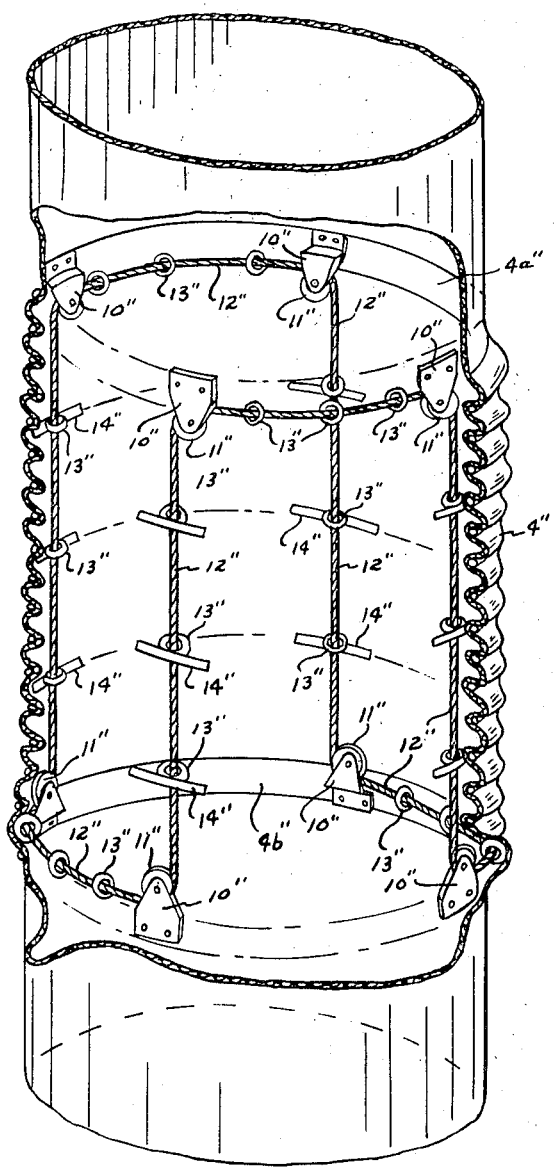
FIG. 9 is a fragmentary somewhat schematic perspective view of one of the joint portions such as shown in FIG. 6, and in straight condition.
Figure 10:
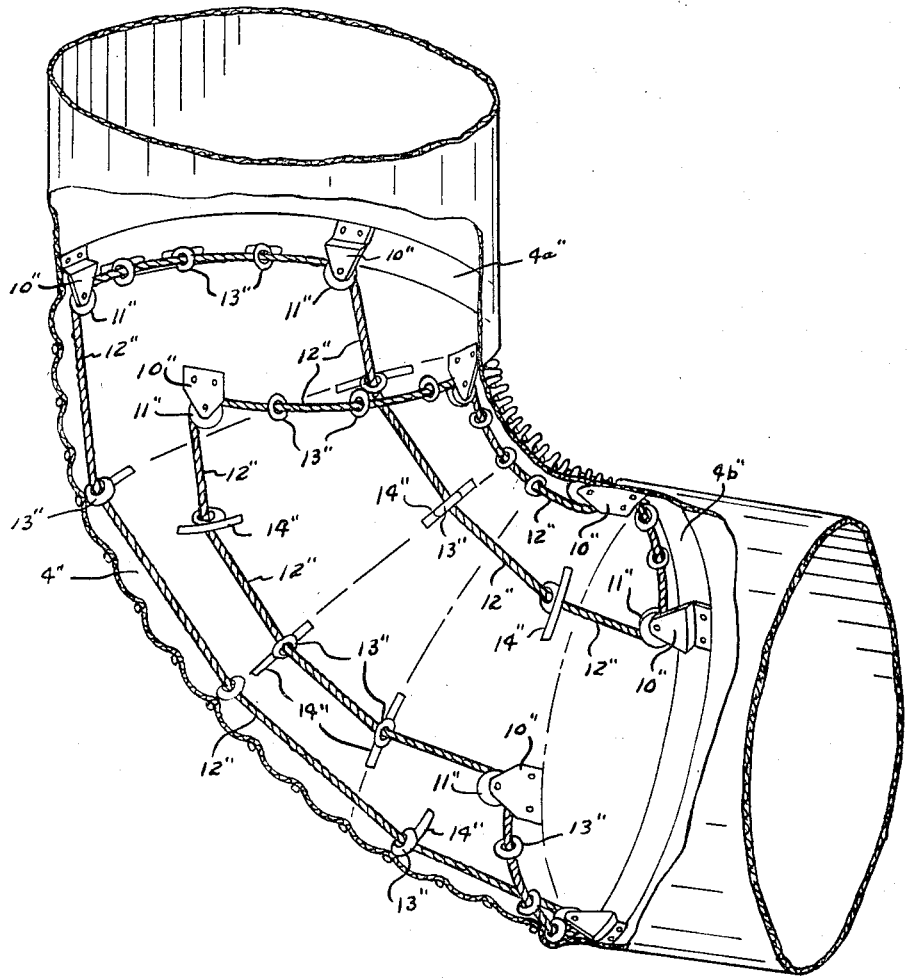
FIG. 10 is a fragmentary somewhat schematic perspective view of the form shown in FIG. 9, but illustrating the joint and cable system when the joint portion is bent.

FIG. 9 schematically illustrates one of the bendable limb enclosure portions in its straight or nonbent condition, while FIG. 10 shows the same when bent. Like parts in this figure which are similar to those in FIGS. 1 and 2, carry similar reference numerals but are double primed.

The bendable, noncircumferentially stretchable flexible air impervious suit material, which is extensible longitudinally, is shown schematically in the figures, for instance in FIGS. 7, 8, 9 and 11, as a tubular or annular sort of multiple bellows structure with circular restraining cords extending around the enclosure between the folds of the bellows. However this material, like the material in my copending patent application, is woven in actual practice with the circular restraining closely spaced cords woven in the material during the fabrication. Also the suit may be made impervious or pressure tight in any conventional way, for instance the suit may be rubber impregnated or coated, or be pressurized by an internal bladder system.

The construction of the invention also contemplates flexible or bendable manipulators which extend outwardly from a higher pressure environment or chamber into a lower or zero pressure environment, for instance for operating controls outside of a pressure chamber, such as outside of a space capsule.

In this form (not shown) a flexible, preferably cylindrical sleeve somewhat like the sleeve or arm enclosure 4 (of FIGS. 1 and 2) for receiving the operator's arm is provided having a closed outer end with a glove or other actuating means forming the outer closure while the other or inner end is fixed and is open into the pressurized environment, for instance the space cabin interior, to receive the operator's hand and arm. The self-equalizing cable system of the invention such as shown in FIG. 8 or 10 would be disposed on the inner surface of the sleeve member, with the pulleys, guide rings, and nonstretchable endless cable extending back and forth between pulleys which are journalled in alternate circumferentially spaced relation around the opposite interior ends of the bendable portions of the manipulator sleeve, after the manner shown in these figures. The internal pressure expands the sleeve to its circular expansion limit while the cable means is tensioned and prevents elongation or extension of the sleeve to balance the inflation (extension) forces in the sleeve, particularly during the bending thereof in any direction.

It should be mentioned that the arm, leg and body portions be of substantially the same diameter or tapered throughout the length of the respective bendable portions. Also the bendable portions around the joints (not shown) may be spherical, ellipsoidal or egg shaped between the opposite ends, with the endless nonstretchable cable means extending back and forth inside between pulleys which are alternately journalled circumferentially around these opposite ends with the guide rings secured to the interior to hold or guide the cables between the pulleys in close proximity to the inner surface of the impervious inflatable bendable enclosures during the angular displacements between the opposite ends of the joints.

I claim:

1. A pressure suit comprising body, leg, and arm enclosure portions composed of flexible, longitudinally extensible, circumferentially substantially nonextensible material, relative to the body, leg, and arm portions of a wearer, having bendable portions therein adapted to enclose the bendable body, leg, and arm joint portions of the wearer, an endless nonstretchable self-adjusting cable restraining means extending back and forth in zigzag fashion between the opposite ends of the bendable joint portions around the interior of said body, leg, and arm portions beyond the opposite ends of said bendable portions, cable guide means secured to the interior of the body, leg, and arm portions of the suit in circumferentially spaced relation around each of the opposite ends of said bendable portions slidably receiving and guiding said selfadjusting restraining cable means therethrough for restraining longitudinal extension of said body, leg, and arm portions of said suit during bending movements thereof by a wearer of the suit.

2. An aviator's pressure protective suit having body, arm, and leg enclosures, formed with bendable portions therein adapted to enclose the bendable portions of a wearer's body, arms, and legs, said body, arm, and leg enclosures being extensible longitudinally and nonextensible circumferentially, formed of flexible one-way stretch material, annular anchor bands secured therein at the opposite ends of the bendable portions of said body, arm, and leg enclosures, an equal number of cable guide pulleys equally spaced circumferentially around the inside of each of said anchor bands at the opposite ends of said bendable portions, in circumferentially staggered relation to each other on the anchor bands at the opposite ends of the bendable portions, and endless nonstretchable self-adjustable cable restraining means alternately extending inside of the suit through the pulleys at the opposite ends of the inside of said bendable portions in zigzag back and forth fashion around said bendable portions to resist extension of the bendable portions of the body, arm, and leg enclosures when the suit is pressurized and to provide self-adjustment during bending of the bendable portions and equalize the restraining tension of the cable restraining means between the opposite ends of the bendable portions.

3. A pressure protective suit as set forth in claim 2 in which the pulleys are journalled on the inside of the anchor bands at the opposite ends of the bendable portion in substantially opposite relation at said opposite ends, and said endless nonstretchable, self-adjustable restraining cable means extends alternately longitudinally between a first pair of opposite pulleys at the opposite ends of the bendable portions then circumferentially around the interior of the suit between a second pair of pulleys at the opposite end of the interior of the bendable portion then longitudinally across the interior of the bendable portion to a second pair of pulleys at the opposite end of the bendable portion, then circumferentially around the interior of said opposite end, to provide an endless nonstretchable restraining self-adjusting cable system having longitudinal cable reaches between said opposite ends and circumferential reaches extending alternately at said opposite ends between said longitudinal reaches so as to surround the interior of the bendable portions.

References Cited

UNITED STATES PATENTS

| 2,664,566 | 1/1954 | Mianulli | 2—2.1 |
| 2,894,535 | 7/1959 | Hansen | 2—2.1 X |
| 3,034,131 | 5/1962 | Lent | 2—2.1 |

FOREIGN PATENTS 977,172  12/1964  Great Britain.

VERLIN R. PENDEGRASS, *Primary Examiner.*